(12) United States Patent
Trestain et al.

(10) Patent No.: US 11,729,549 B2
(45) Date of Patent: Aug. 15, 2023

(54) VOICE DUCKING WITH SPATIAL SPEECH SEPARATION FOR VEHICLE AUDIO SYSTEM

(71) Applicant: HARMAN INTERNATIONAL INDUSTRIES, INCORPORATED, Stamford, CT (US)

(72) Inventors: Christopher Michael Trestain, Livonia, MI (US); Riley Winton, Opelika, AL (US); Christopher Ludwig, Bloomfield Hills, MI (US)

(73) Assignee: Harman International Industries, Incorporated, Stamford, CT (US)

(*) Notice: Subject to any disclaimer, the term of this patent is extended or adjusted under 35 U.S.C. 154(b) by 140 days.

(21) Appl. No.: 17/130,175

(22) Filed: Dec. 22, 2020

(65) Prior Publication Data

US 2021/0204059 A1 Jul. 1, 2021

Related U.S. Application Data

(60) Provisional application No. 62/954,991, filed on Dec. 30, 2019.

(51) Int. Cl.
*H04R 3/00* (2006.01)
*G10L 15/22* (2006.01)
*H04R 3/12* (2006.01)

(52) U.S. Cl.
CPC .............. *H04R 3/005* (2013.01); *G10L 15/22* (2013.01); *H04R 3/12* (2013.01); *G10L 2015/225* (2013.01); *G10L 2015/228* (2013.01); *H04R 2499/13* (2013.01)

(58) Field of Classification Search
CPC ...... H04R 3/005; H04R 3/12; H04R 2499/13; H04R 1/406; H04R 3/02; H04R 3/04; H04R 5/02; H04R 2201/401; H04R 2201/405; H04R 2420/01; H04R 2430/01; H04R 2430/20; G10L 15/22; G10L 21/02; G10L 2015/225; G10L 2015/228; G10L 2021/02166; G10L 2025/783; G10L 25/78; G10L 21/0216; G10L 25/84; B60R 11/0247

See application file for complete search history.

(56) References Cited

U.S. PATENT DOCUMENTS

| | | |
|---|---|---|
| 9,508,344 B2 | 11/2016 | Srail |
| 2010/0189275 A1* | 7/2010 | Christoph ............ H04R 3/005 381/86 |
| 2018/0020313 A1* | 1/2018 | Morishita ............. H04S 7/304 |
| 2018/0308504 A1* | 10/2018 | Hera ................. G10L 21/0232 |
| 2021/0067873 A1* | 3/2021 | Winton .................. H04R 3/02 |

FOREIGN PATENT DOCUMENTS

| | | | |
|---|---|---|---|
| WO | 2018130282 A1 | 4/2019 | |
| WO | WO-2019130282 A1 * | 7/2019 | ......... G10L 21/0216 |

* cited by examiner

*Primary Examiner* — Yogeshkumar Patel
(74) *Attorney, Agent, or Firm* — Brooks Kushman, P.C.

(57) ABSTRACT

A vehicle loudspeaker system, including at least two microphones forming a microphone array, at least one loudspeaker configured to emit non-human sound, a processor programmed to receive incoming audio signals from the microphone array. The processor further programmed to apply beamforming to the incoming audio signals, determine whether human generated sound is detected within the audio signal, and instruct the loudspeaker to adjust the non-human sound in response to human generated sound being detected.

11 Claims, 11 Drawing Sheets

VOICE DUCKING WITH SPATIAL SPEECH SEPARATION FOR VEHICLE AUDIO SYSTEM

CROSS-REFERENCE TO RELATED APPLICATIONS

This application claims the benefit of U.S. provisional application Ser. No. 62/954,991 filed Dec. 30, 2019, the disclosure of which is hereby incorporated in its entirety by reference herein.

TECHNICAL FIELD

The present disclosure relates to a system for voice ducking with spatial speech separation for vehicle audio system.

BACKGROUND

Current vehicle cabin acoustics predicate that any sound that occurs in the cabin will generally be perceived as one noisy stimulus. Common examples of interference sources include road noise, wind noise, passenger speech, and multimedia content. The presence of these noise sources complicate speech perception by reducing speech intelligibility, signal-to noise ratio, and subjective call quality. Voice ducking may be used to increase the quality and satisfaction of drivers within the vehicle. However, algorithms used to determine whether audio signals include human speech are often cumbersome and inaccurate.

SUMMARY

A vehicle loudspeaker system, including at least two microphones forming a microphone array, at least one loudspeaker configured to emit non-human sound, a processor programmed to receive incoming audio signals from the microphone array. The processor further programmed to apply beamforming to the incoming audio signals, determine whether human generated sound is detected within the audio signal, and instruct the loudspeaker to adjust the non-human sound in response to human generated sound being detected.

A non-transitory computer-readable medium including instructions for a loudspeaker system that generates audio in a vehicle, including receiving incoming audio signals from a vehicle microphone array, applying beamforming to the incoming audio signals, determining whether human generated sound is detected within the audio signal, and instructing a loudspeaker to adjust the non-human sound in response to human generated sound being detected.

A method for generating audio via a loudspeaker system in a vehicle, including receiving incoming audio signals from a vehicle microphone array, applying beamforming to the incoming audio signals, determining whether human generated sound is detected within the audio signal, and instructing a loudspeaker to adjust the non-human sound in response to human generated sound being detected.

DETAILED DESCRIPTION

Figure 1:
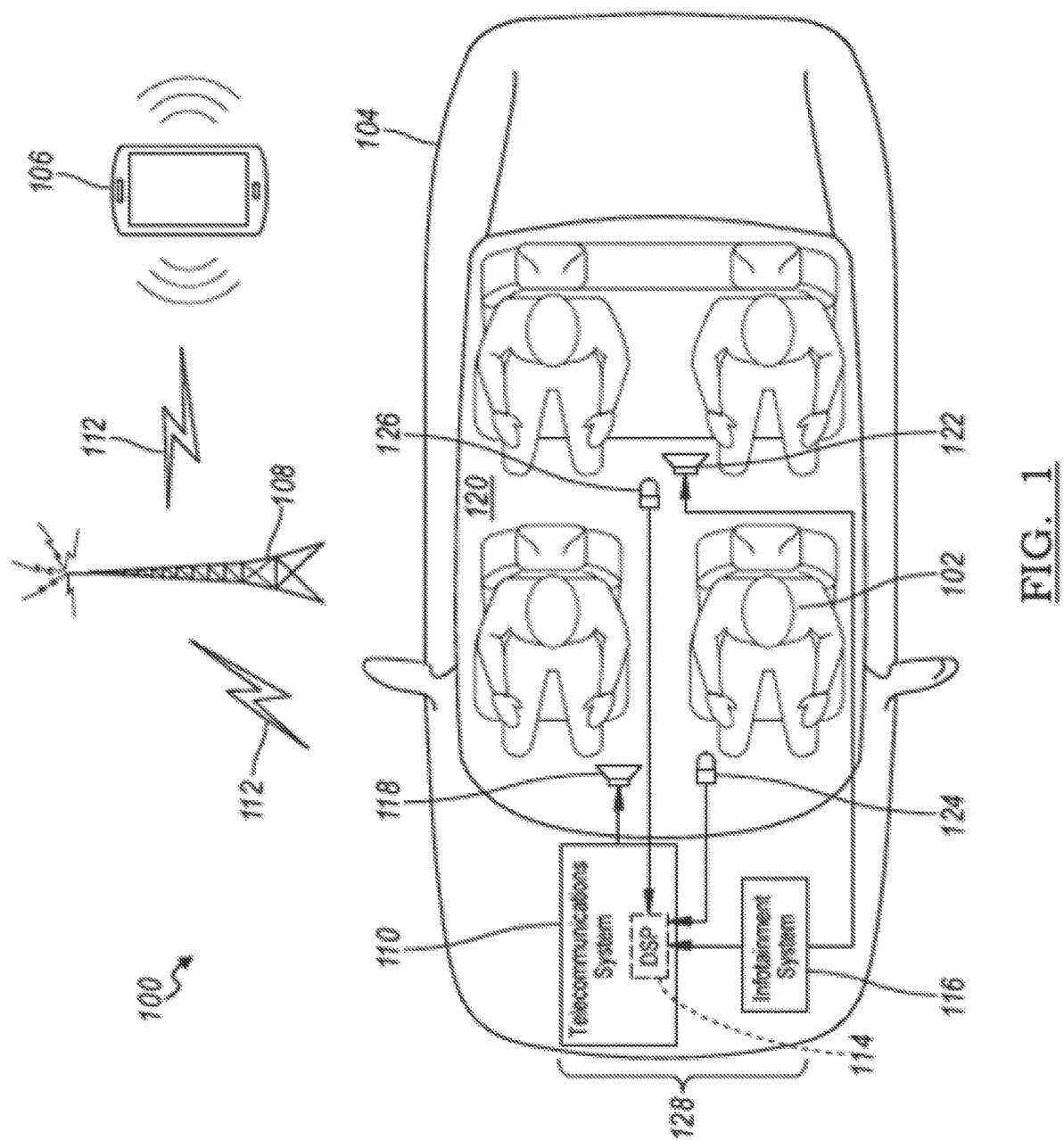
FIG. 1 illustrates a telecommunications network for facilitating telecommunication between a near-end participant in a vehicle and a remote, far-end participant located outside the vehicle, according to one or more embodiments of the present disclosure.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Described herein is a beamforming approach to voice ducking. A voice ducking system may aid in automatically adjusting the volume of a distracting media signal when users are trying to converse. When speech is completed, the media may automatically adjust to resume the higher volume. An array of microphones and a beamforming process may be used to receive and identify speech signals from a narrow spatial region of interest around a user's head and mouth. This allows any and all sounds from that region of interest to be immediately routed into the voice ducking engine.

Voice ducking is a common method to promote clear communications. When a voice signal is present, the volume of the media is seamlessly "ducked" or attenuated o make it easier to communicate. Many existing systems use an algorithm to determine when a microphone's incoming speech signal contains human speech. These algorithms are cumbersome, large, and may require a given latency before an incoming signal may be confirmed as a speech signal. This means that the beginning of a user's statements may not be routed into the ducking engine. Additionally, non-speech utterances such as "uh", "pfft," or "shh" may not be classified as speech signals and therefore will not be routed to the ducking engine.

Since the concepts disclosed herein rely on a spatial area of interest, any and all sounds from that region of interest are automatically and immediately routed into the ducking engine. This includes the non-speech utterances, and does not require any latency as the region of interest is already defined and localized via the beamforming. Thus, directional microphones and cumbersome signal processing are avoided.

The present disclosure also describes an in-vehicle noise-cancellation system for optimizing far-end user experience. The noise-cancellation system may improve the intelligibility of near-end speech at the far-end of a communications exchange, including a telecommunications exchange or dialogue with a virtual personal assistant, or the like. The noise-cancellation system may incorporate real-time acoustic input from the vehicle, as well microphones from a telecommunications device. Moreover, audio signals from small, embedded microphones mounted in the car can be processed and mixed into an outgoing telecommunications signal to effectively cancel acoustic energy from one or more unwanted sources in the vehicle. Audio playing from a known audio stream (e.g., music, sound effects, and dialog from a film audio) in the vehicle's infotainment system, in addition to unwanted noise (e.g., children yelling and background conversations) captured by the embedded microphones, may be used as direct inputs to the noise-cancellation system. As direct inputs, these streams can, therefore, be cancelled from the outgoing telecommunications signal, thus providing the user's far-end correspondent with much higher signal-to-noise ratio, call quality, and speech intelligibility.

FIG. 1 illustrates a telecommunications network 100 for facilitating a telecommunications exchange between a near-end participant 102 in a vehicle 104 and a remote, far-end participant 106 located outside the vehicle via a cellular base station 108. The vehicle 104 may include a telecommunications system 110 for processing incoming and outgoing telecommunications signals, collectively shown as telecommunications signals 112 in FIG. 1. The telecommunications system 110 may include a digital signal processor (DSP) 114 for processing audio telecommunications signals, as will be described in greater detail below. According to another embodiment, the DSP 114 may be a separate module from the telecommunications system 110. A vehicle infotainment system 116 may be connected to the telecommunications system 110. A first transducer 118 or speaker may transmit the incoming telecommunications signal to the near-end participant of a telecommunications exchange inside a vehicle cabin 120. Accordingly, the first transducer 118 may be located adjacent to a near-end participant or may generate a sound field localized at a particular seat location occupied by the near-end participant. A second transducer 122 may transmit audio from the vehicle's infotainment system 116 (e.g., music, sound effects, and dialog from a film audio).

A first microphone array 124 may be located in the vehicle cabin 120 to receive speech of the near-end participant (i.e., driver or another occupant of the source vehicle) in a telecommunication. A second microphone array 126 may be located in the vehicle cabin 120 to detect unwanted audio sources (e.g., road noise, wind noise, background speech, and multimedia content), collectively referred to as noise. Collectively, the telecommunications system 110, the DSP 114, the infotainment system 116, the transducers 118, 122, and the microphone arrays 124, 126 may form an in-cabin noise cancellation system 128 for far-end telecommunications.

Figure 2:
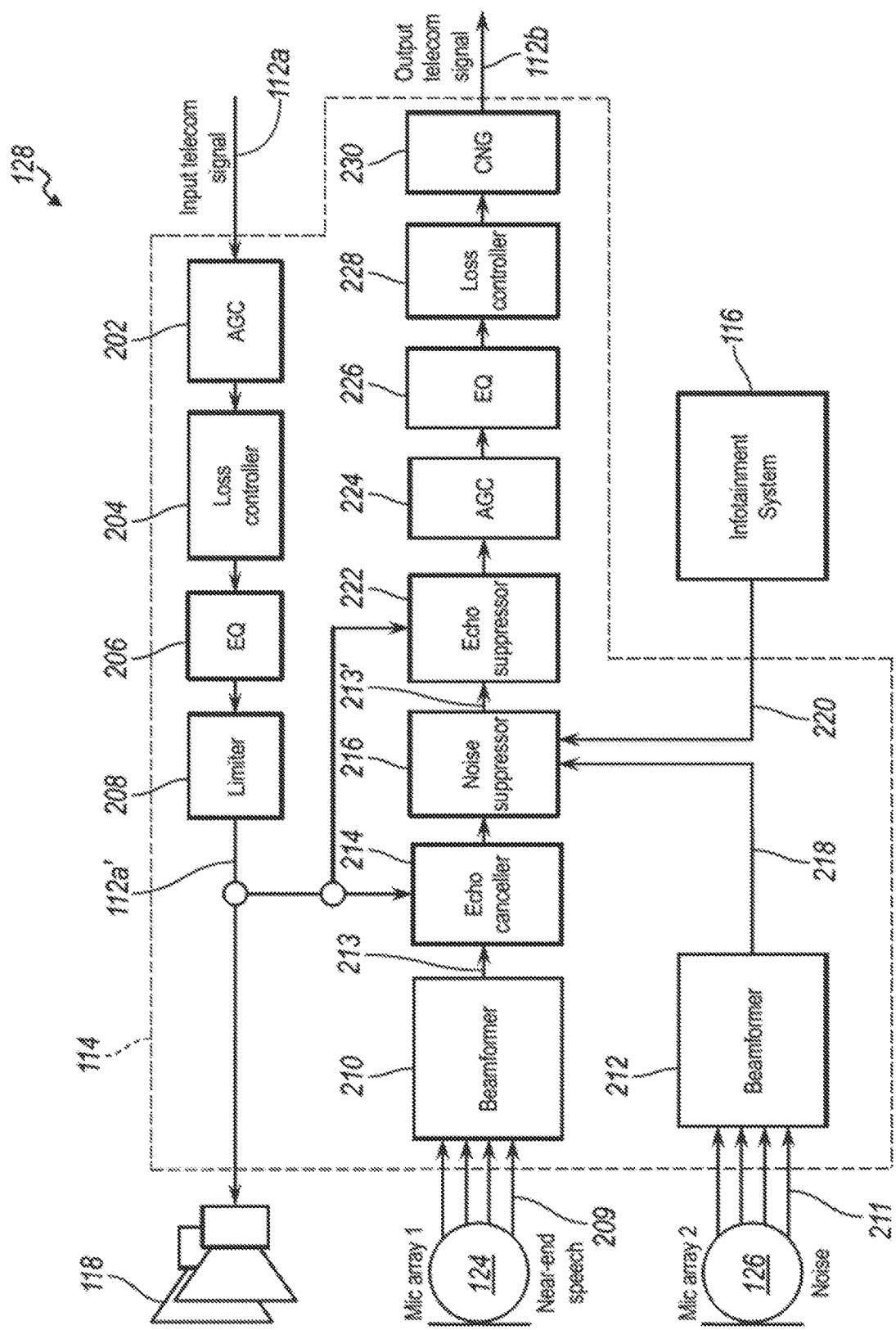
FIG. 2 is a block diagram of an in-cabin noise cancellation system for far-end telecommunications, according to one or more embodiments of the present disclosure.

FIG. 2 is a block diagram of the noise cancellation system 128 depicted in FIG. 1. As show in FIG. 2, an incoming telecommunications signal 112a from a far-end participant (not shown) may be received by the DSP 114. The DSP 114 may be a hardware-based device, such as a specialized microprocessor and/or combination of integrated circuits optimized for the operational needs of digital signal processing, which may be specific to the audio application disclosed herein. The incoming telecommunications signal 112a may undergo automatic gain control at an automatic gain controller (AGC) 202. The AGC 202 may provide a controlled signal amplitude at its output, despite variation of the amplitude in the input signal. The average or peak output signal level is used to dynamically adjust the input-to-output gain to a suitable value, enabling the circuit to work satisfactorily with a greater range of input signal levels. The output from the AGC 202 may then be received by a loss controller 204 to undergo loss control, which is then passed to an equalizer 206 to equalize the incoming telecommunications signal 112a. Equalization is the process of adjusting the balance between frequency components within an electronic signal. Equalizers strengthen (boost) or weaken (cut) the energy of specific frequency bands or "frequency ranges."

The output of the equalizer 206 may be received by a limiter 208. A limiter is a circuit that allows signals below a specified input power or level to pass unaffected while attenuating the peaks of stronger signals that exceed this threshold. Limiting is a type of dynamic range compression; it is any process by which a specified characteristic (usually amplitude) of the output of a device is prevented from exceeding a predetermined value. Limiters are common as a safety device in live sound and broadcast applications to prevent sudden volume peaks from occurring. A digitally processed incoming telecommunications signal 112a' may then be received by the first transducer 118 for audible transmission to the near-end participant of the telecommunications exchange.

Figure 4:
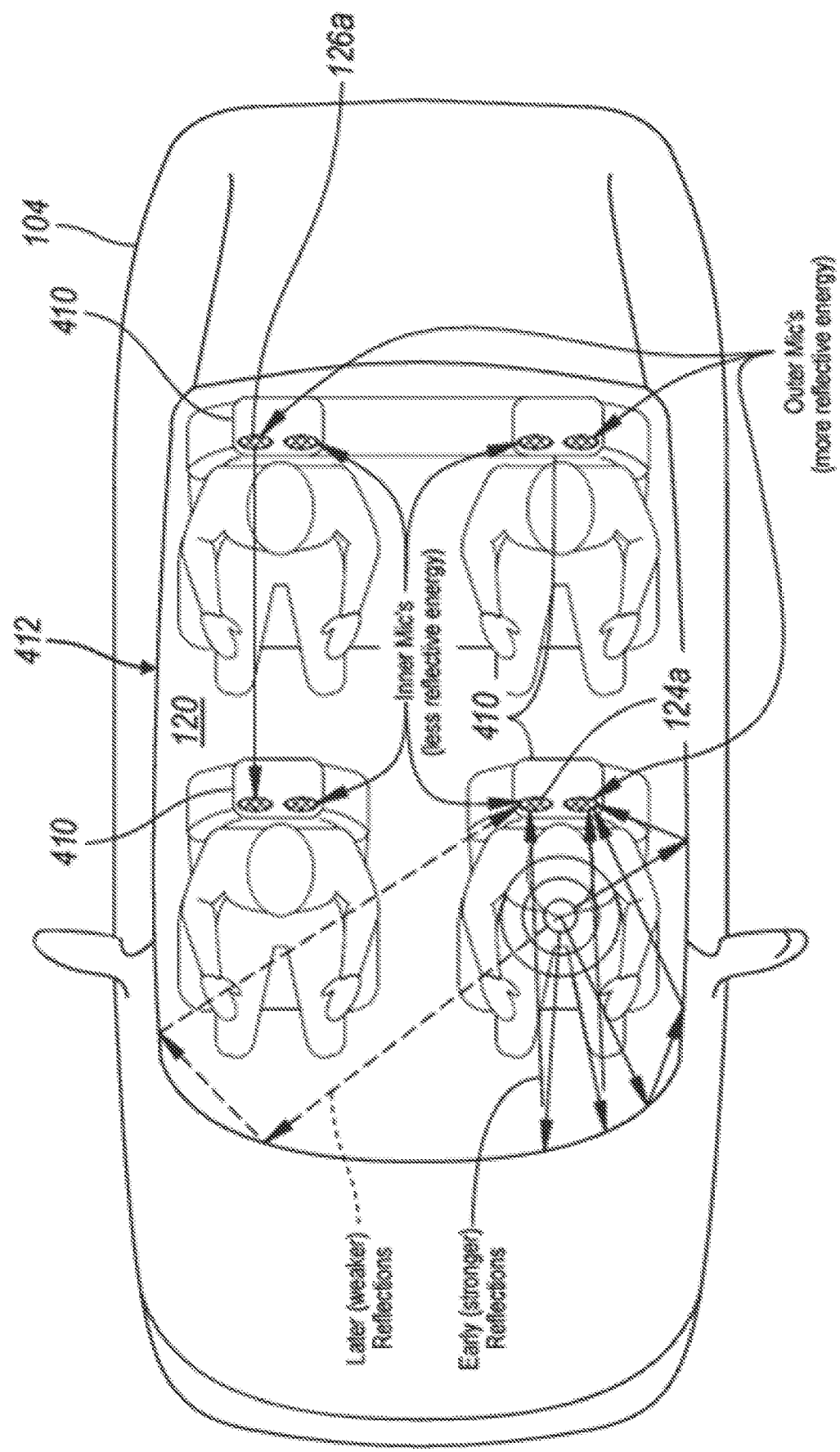
FIG. 4 illustrates an exemplary microphone placement, according to one or more embodiments of the present disclosure.

As also shown in FIG. 2, noise cancellation system 128 may include the first microphone array 124 and the second microphone array 126. The first microphone array 124 may include a plurality of small, embedded microphones strategically located in the vehicle cabin to receive speech from a near-end participant (i.e., driver or another occupant of the source vehicle) of the telecommunications exchange. The first microphone array 124 may be positioned as close to the near-end participant as possible, while being as far from reflective surfaces as possible. For instance, the first microphone array 124 may be embedded in a headrest or headliner or the like, as shown in FIG. 4. The second microphone array 126 may include a plurality of small, embedded microphones strategically located in the vehicle cabin to detect unwanted audio sources (e.g., road noise, wind noise, background speech, and multimedia content), collectively referred to as noise.

Both inputs to the first and second microphone arrays, near-end speech and noise, respectively, may be processed using the DSP 114. A set of first audio signals 209 (i.e., indicative of the near-end speech) from the first microphone array 124 may be fed into a first beamformer 210 for beamforming, while a set of second audio signals 211 (i.e., indicative of noise) may be fed into a second beamformer 212. Beamforming or spatial filtering is a signal processing technique used in sensor arrays for directional signal transmission or reception. This is achieved by combining elements in an array in such a way that signals at particular angles experience constructive interference while others experience destructive interference. Beamforming can be used at both the transmitting and receiving ends to achieve spatial selectivity. The improvement compared with omni-directional reception/transmission is known as the directivity of the array. To change the directionality of the array when transmitting, a beamformer controls the phase and relative amplitude of the signal at each transmitter, to create a pattern of constructive and destructive interference in the wavefront. When receiving, information from different sensors is combined in a way where the expected pattern of radiation is preferentially observed.

The first beamformer 210 may output a near-end speech signal 213 indicative of the near-end speech detected by the first microphone array 124. Alternatively, the near-end speech signal 213 may be received by the DSP 114 directly from the first microphone array 124 or an individual microphone in the first microphone array. The second beamformer 212 may output a noise signal 218 indicative of the unpredictable, background noise detected by the second microphone array 126. Alternatively, the noise signal 218 may be received by the DSP 114 directly from the second microphone array 126 or an individual microphone in the second microphone array.

The near-end speech signal 213 may be received by an echo canceller 214 along with the digitally processed incoming telecommunications signal 112a' from the far-end participant 106. Echo cancellation is a method in telephony to improve voice quality by removing echo after it is already present. In addition to improving subjective quality, this process increases the capacity achieved through silence suppression by preventing echo from traveling across a network. There are various types and causes of echo with unique characteristics, including acoustic echo (sounds from a loudspeaker being reflected and recorded by a microphone, which can vary substantially over time) and line echo (electrical impulses caused by, e.g., coupling between the sending and receiving wires, impedance mismatches, electrical reflections, etc., which varies much less than acoustic echo). In practice, however, the same techniques are used to treat all types of echo, so an acoustic echo canceller can cancel line echo as well as acoustic echo. Echo cancellation involves first recognizing the originally transmitted signal that re-appears, with some delay, in the transmitted or received signal. Once the echo is recognized, it can be removed by subtracting it from the transmitted or received signal. Though this technique is generally implemented digitally using a digital signal processor or software, although it can be implemented in analog circuits as well.

The output of the echo canceller 214 may be mixed with the noise signal 218 (i.e., unpredictable noise) from the second beamformer 212 and an infotainment audio signal 220 (i.e., predictable noise) from the infotainment system 116 at a noise suppressor 216. Mixing the near-end speech signal 213 with the noise signal 218 and/or the infotainment audio signal 220 at the noise suppressor 216 can effectively cancel acoustic energy from one or more unwanted sources in the vehicle 104. The audio playing from a known audio stream (e.g., music, sound effects, and dialog from a film audio) in the vehicle's infotainment system 116 may be considered predictable noise and may be used as a direct input to the noise-cancellation system 128 and cancelled or suppressed from the near-end speech signal 213. Moreover, additional unwanted and unpredictable noise (e.g., children yelling and background conversations) captured by the embedded microphones may also be used as direct inputs to the noise-cancellation system 128. The unwanted noise may be cancelled or suppressed from the near-end speech signal 213 by the noise suppressor 216 based on the noise signal 218 and the infotainment audio signal 220 before being communicated to the far-end participant as an outgoing telecommunications signal 112b. Noise suppression is an audio pre-processor that removes background noise from the captured signal.

A noise-suppressed, near-end speech signal 213' may be output from the noise suppressor 216 and may be mixed with the processed incoming telecommunications signal 112a' from the far-end participant at an echo suppressor 222. Echo suppression, like echo cancellation, is a method in telephony to improve voice quality by preventing echo from being created or removing it after it is already present. Echo suppressors work by detecting a voice signal going in one direction on a circuit, and then inserting a great deal of loss in the other direction. Usually the echo suppressor at the far-end of the circuit adds this loss when it detects voice coming from the near-end of the circuit. This added loss prevents the speaker from hearing their own voice.

The output from the echo suppressor 222 may then undergo automatic gain control at an automatic gain controller (AGC) 224. The AGC 224 may provide a controlled signal amplitude at its output, despite variation of the amplitude in the input signal. The average or peak output signal level is used to dynamically adjust the input-to-output gain to a suitable value, enabling the circuit to work satisfactorily with a greater range of input signal levels. The output from the AGC 224 may then be received by an equalizer 226 to equalize the near-end speech signal. Equalization is the process of adjusting the balance between frequency components within an electronic signal. Equalizers strengthen (boost) or weaken (cut) the energy of specific frequency bands or "frequency ranges."

The output from the equalizer 226 may be sent to a loss controller 228 to undergo loss control. The output may then be passed through a comfort noise generator (CNG) 230. CNG 230 is a module that inserts comfort noise during periods that there is no signal received. CNG may be used in association with discontinuous transmission (DTX). DTX means that a transmitter is switched off during silent periods. Therefore, the background acoustic noise abruptly disappears at the receiving end (e.g. far-end). This can be very annoying for the receiving party (e.g., the far-end participant). The receiving party might even think that the line is dead if the silent period is rather long. To overcome these problems, "comfort noise" may be generated at the receiving end (i.e., far-end) whenever the transmission is switched off. The comfort noise is generated by a CNG. If the comfort noise is well matched to that of the transmitted background acoustic noise during speech periods, the gaps between speech periods can be filled in such a way that the receiving party does not notice the switching during the conversation. Since the noise constantly changes, the comfort noise generator 230 may be updated regularly.

The output from the CNG 230 may then be transmitted by the telecommunications system to the far-end participant of the telecommunications exchange as the outgoing telecommunications signal 112b. By cancelling noise inputs directly from the outgoing telecommunications signal, a user's far-end correspondent may be provided with much higher signal-to-noise ratio, call quality, and speech intelligibility.

Although shown and described as improving near-end speech intelligibility at a far-end participant of a telecommunications exchange, the noise-cancellation system 128 may be employed to improve near-end speech intelligibility at a far-end of any communications exchange. For instance, the noise-cancellation system 128 may be used in connection with virtual personal assistance (VPA) applications to optimize speech recognition at the far-end (i.e., a virtual personal assistant). Accordingly, background (unwanted) noise may be similarly suppressed or canceled from the near-end speech of a communications exchange with the VPA.

Figure 3:
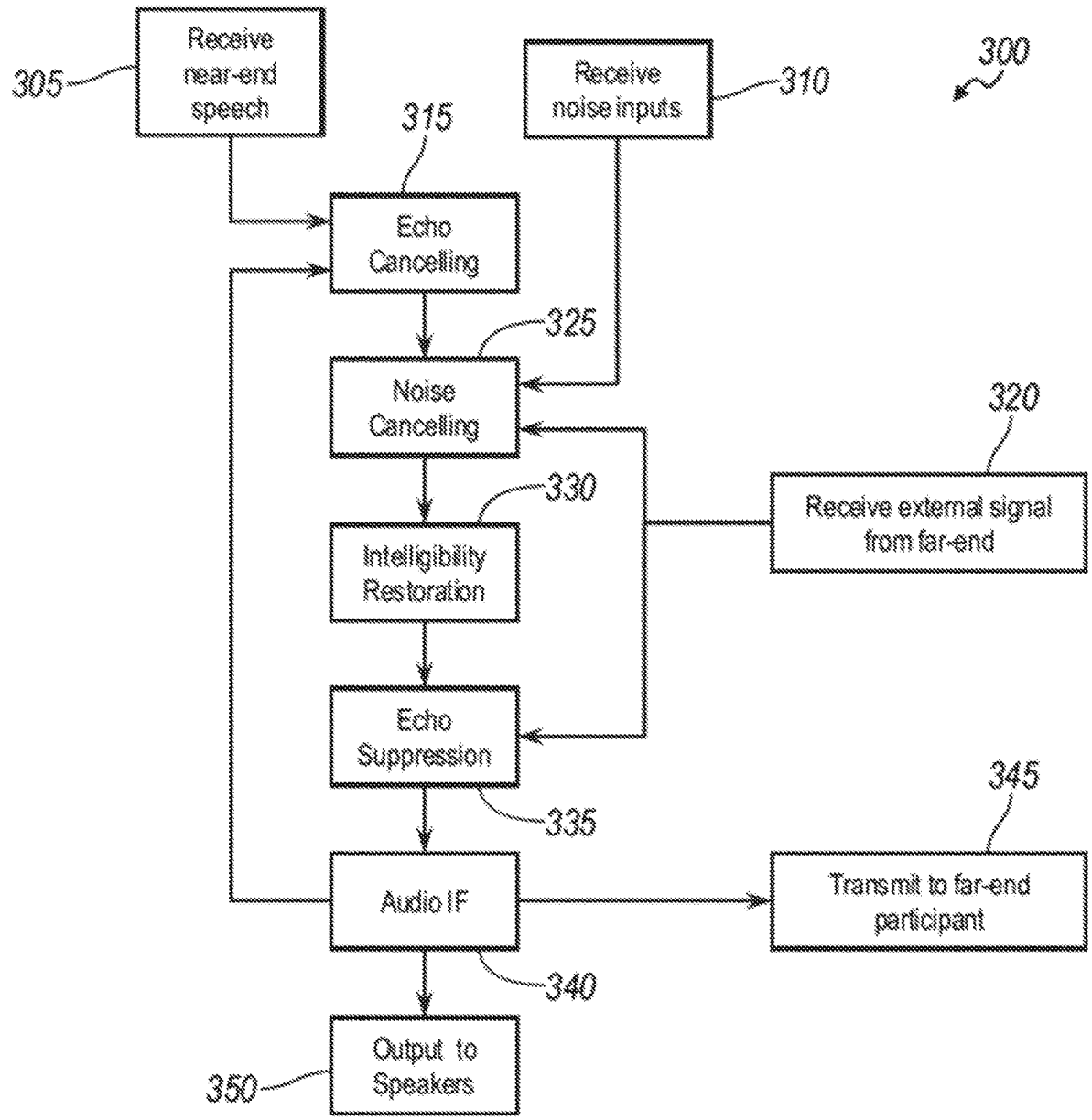
FIG. 3 is a simplified, exemplary flow diagram depicting a noise cancellation method 300 for far-end telecommunications, according to one or more embodiments of the present disclosure.

FIG. 3 is a simplified, exemplary flow diagram depicting a noise cancellation method 300 for far-end telecommunications. At step 305, near-end speech may be received at the noise cancellation system 128 by a microphone array, such as the first microphone array 124. Meanwhile, the noise cancellation system 128 may receive audio input streams from unwanted sources, such as unpredictable noise from the second microphone array 126 and/or predictable noise from the infotainment system 116, as provided at step 310. The near-end speech may be processed into an outgoing telecommunications signal 112b for receipt by a far-end participant of a telecommunications exchange. Accordingly, at step 315, the near-end speech signal may undergo an echo cancelling operation to improve voice quality by removing echo after it is already present. As previously described, echo cancellation involves first recognizing the originally transmitted signal that re-appears, with some delay, in the transmitted or received signal. Once the echo is recognized, it can be removed by subtracting it from the transmitted or received signal.

The near-end speech signal may be received at a noise suppressor along with the noise inputs received at step 310 and an incoming telecommunications signal for the far-end participant (step 320). During noise cancelling, the noise may be cancelled or suppressed from the near-end speech signal, as provided at step 325. At step 330, intelligibility of the speech in the near-end speech signal may be restored by reducing or cancelling the effects of masking by extraneous sounds. The near-end speech signal may then undergo echo suppression using the incoming telecommunications signal, as provided at step 335. As previously described, echo suppression, like echo cancellation, is a method in telephony to improve voice quality by preventing echo from being created or removing it after it is already present. The near-end speech signal may undergo additional audio filtering at step 340 before it is transmitted to the far-end participant (step 345) via the telecommunications network as an outgoing telecommunications signal. Meanwhile, the incoming telecommunications signal may be played in the vehicle cabin through speakers (step 350).

FIG. 4 illustrates an exemplary microphone placement within the cabin 120 of the vehicle 104, according to one or more embodiments of the present disclosure. For example, a first microphone 124a, from the first microphone array 124, for picking up near-end speech may be embedded in one or more headrests 410. A second microphone 126a, from the second microphone array 126, for picking up noise may also be embedded in one or more headrests 410, a headliner (not shown), or the like. As shown, microphones positioned toward the inside of passengers with respect to the vehicle cabin 120, as near a user's mouth as possible, may minimize the reflective energy in the signal, as compared to microphones positioned to the outside of passengers with respect to the vehicle cabin. This is because microphones positioned to the outside of passengers with respect to the vehicle cabin may receive more reflective energy from reflective surfaces 412, such as glass, enclosing the vehicle cabin 120. Minimizing the reflective energy in the near-end speech signal may increase speech intelligibility at the far-end of a telecommunication. The placement and/or location of the microphones shown in FIG. 4 is an example only. The exact location of the microphone arrays will depend on boundaries and coverage area inside a vehicle.

Figure 5:
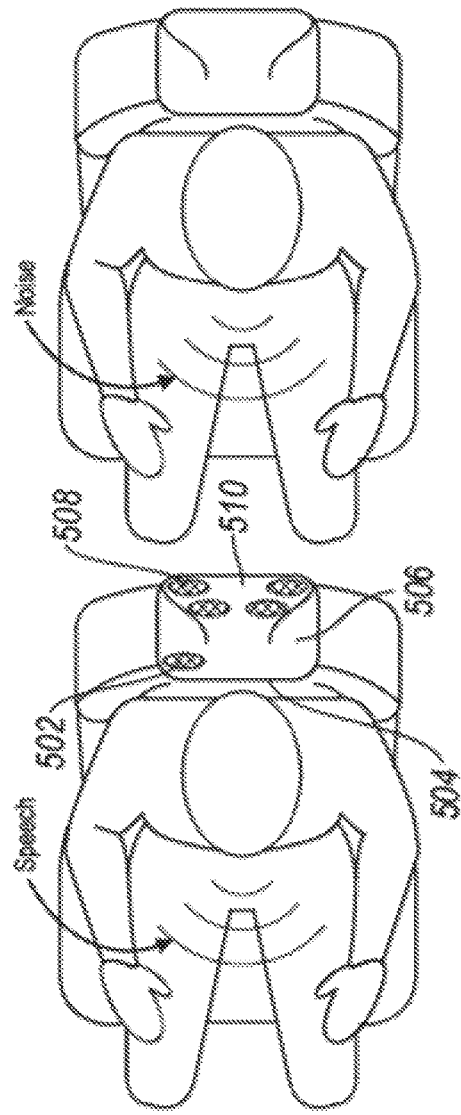
FIG. 5 illustrates an exemplary set-up for a headrest-based telecommunications system for a vehicle, according to one or more embodiments of the present disclosure.
Figure 6:
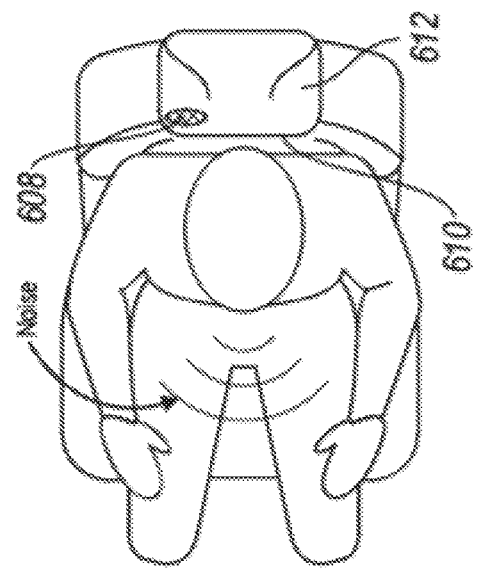
FIG. 6 illustrates another exemplary set-up for a headrest-based telecommunications system for a vehicle, according to one or more embodiments of the present disclosure.

FIG. 5 illustrates an exemplary set-up for a headrest-based telecommunications system for a vehicle. A first, forward-facing microphone array 502 may be placed near a front 504 of a front passenger headrest 506 for receiving near-end speech of a telecommunications exchange. A second, rearward-facing microphone array 508 may be placed near a back 510 of the front passenger headrest 506 for receiving noise, including background speech. FIG. 6 illustrates another exemplary set-up for a headrest-based telecommunications system for a vehicle. A first, forward-facing microphone array 602 may be placed near a front 604 of a front passenger headrest 606 for receiving near-end speech of a telecommunications exchange. A second, forward-facing microphone array 608 may be placed near a front 610 of a rear passenger headrest 612 for receiving noise, including background speech. As with FIG. 4, the exact location of the microphone arrays illustrated in FIGS. 5 and 6 will depend on boundaries and coverage area inside a vehicle.

Figure 7:
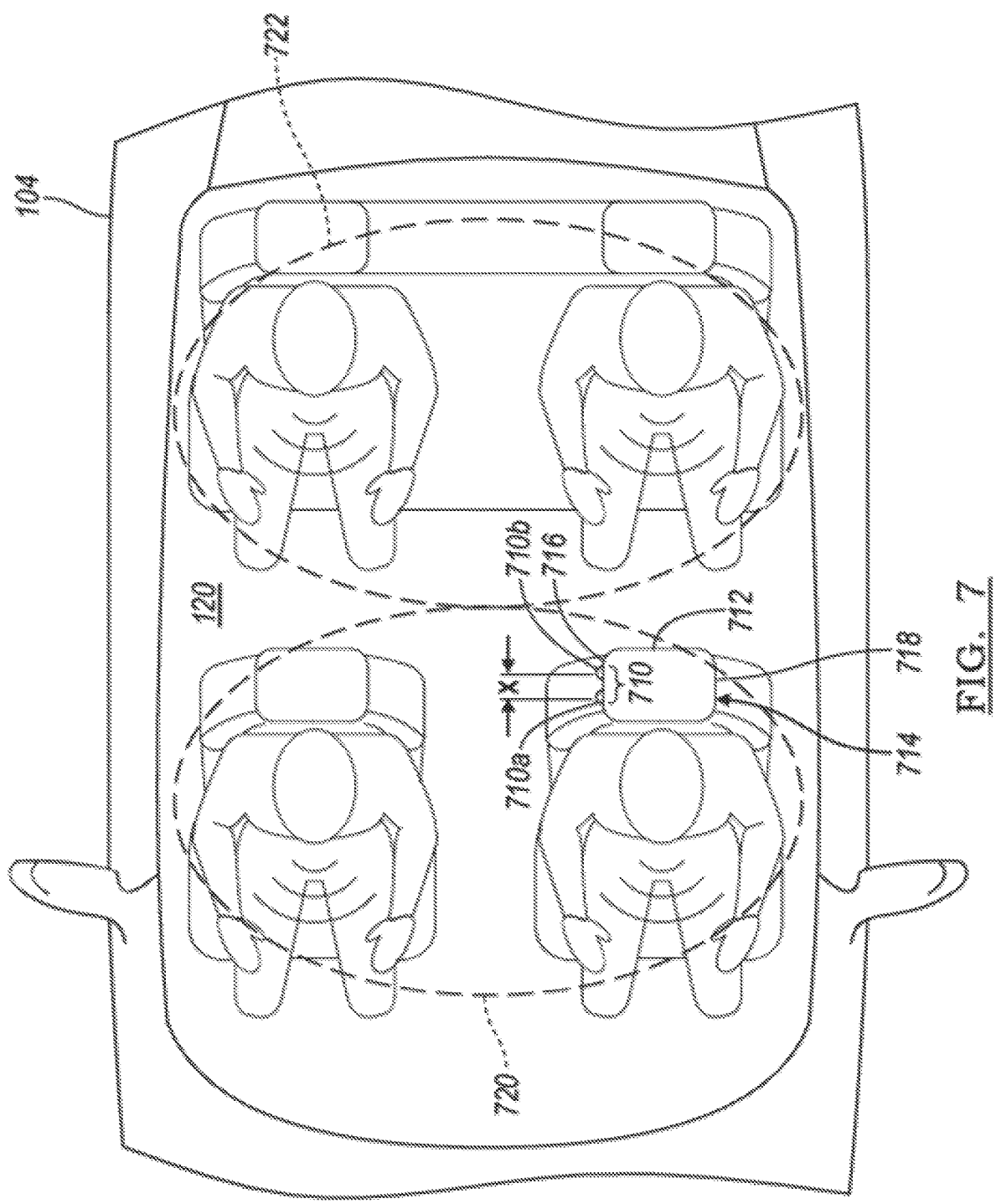
FIG. 7 is a plan view of a vehicle including at least one headrest microphone array for use in an in-cabin noise cancellation system, according to one or more embodiments of the present disclosure.

FIGS. 7-10 depict various plan views of sample microphone configurations for the noise cancellation system 128 (not shown) within the cabin 120 of a vehicle, such as vehicle 104. As with the microphones and microphone arrays described in connection with FIGS. 1 and 2, the various microphone arrays and/or individual microphones shown in FIGS. 7-10 may be in communication with the digital signal processor 114 to work in connection with a vehicle communications system, such as an in-car communications system or telecommunications system 110. For example, FIG. 7 is a plan view of the vehicle 104 depicting a first sample microphone configuration, in accordance with one or more embodiments of the present disclosure. As shown, the noise cancellation system 128 (not shown) may include at least one microphone array 710 including at least two microphones—a first microphone 710a and a second microphone 710b. The first and second microphones may be mounted to an external surface 712 of a first headrest 714 at spaced-apart locations. The first headrest 714 may be a driver's side headrest.

The external surface 712 of the first headrest 714 may include an inboard side surface 716 and an outboard side surface 718. The inboard side surface 716 may be nearer a center of the vehicle cabin 120 than the outboard side surface 718, which is nearer a side of the vehicle 104, including reflective surfaces 412 (see FIG. 4). As shown in FIG. 7, the first and second microphones 710a,b may be positioned flush on the inboard side surface 716 of the first headrest 714. The first and second microphones 710a,b may be spaced apart in at least a longitudinal direction with respect to the vehicle 104. Thus, a distance separating the first and second microphones may include at least a longitudinal distance X to create at least a first listening zone 720 and a second listening zone 722 oriented in the longitudinal direction. The longitudinal distance X between the two microphones in the microphone array 710 may give an indication of the direction of incoming sound, generally front or back. Accordingly, the first listening zone 720 may comprise a forward region of the passenger cabin 120, such as a region encompassing a front seating row, while the second listening zone 722 may comprise a region that is oriented rearward of the first listening zone 720, such as a region encompassing a rear passenger seat. In an embodiment, the longitudinal distance X between the first and second microphones 710a,b may be approximately one inch, though other distances between the microphones may be employed to give an indication of the direction of incoming sound, forward or rearward.

The digital signal processor 114 may be programmed to receive microphone signals indicative of sound from the microphone array 710, as shown in FIG. 2, and identify whether the sound is received from a direction of the first listening zone 720 or the second listening zone 722 based on the microphone signals. For instance, the digital signal processor 114 may compare the microphone signals from the first and second microphones 710a,b and localize the direction of the sound from either the first listening zone or the second listening zones based on a time difference of arrival of the microphone signals at each of the two microphones. Moreover, the digital signal processor 114 may suppress or cancel the microphone signals indicative of sound from (the direction of) the second listening zone 722, which may be equated with unwanted or disturbing background noise. On the other hand, the digital signal processor 114 may transmit microphone signals indicative of sound from (the direction of) the first listening zone 720, which may be equated with wanted, near-end speech, to a far-end participant in a communications exchange.

According to an embodiment, the first and second microphones 710a,b may be omnidirectional microphones. According to another embodiment, the first and second microphones 710a,b may be directional microphones having a directivity in the direction of the corresponding listening zones. Accordingly, incoming sound may be attenuated based on the directivity of the microphones such that sound from the first listening zone 720 may be transmitted to a far-end participant while sound from the second listening zone 722 may be suppressed.

Figure 8:
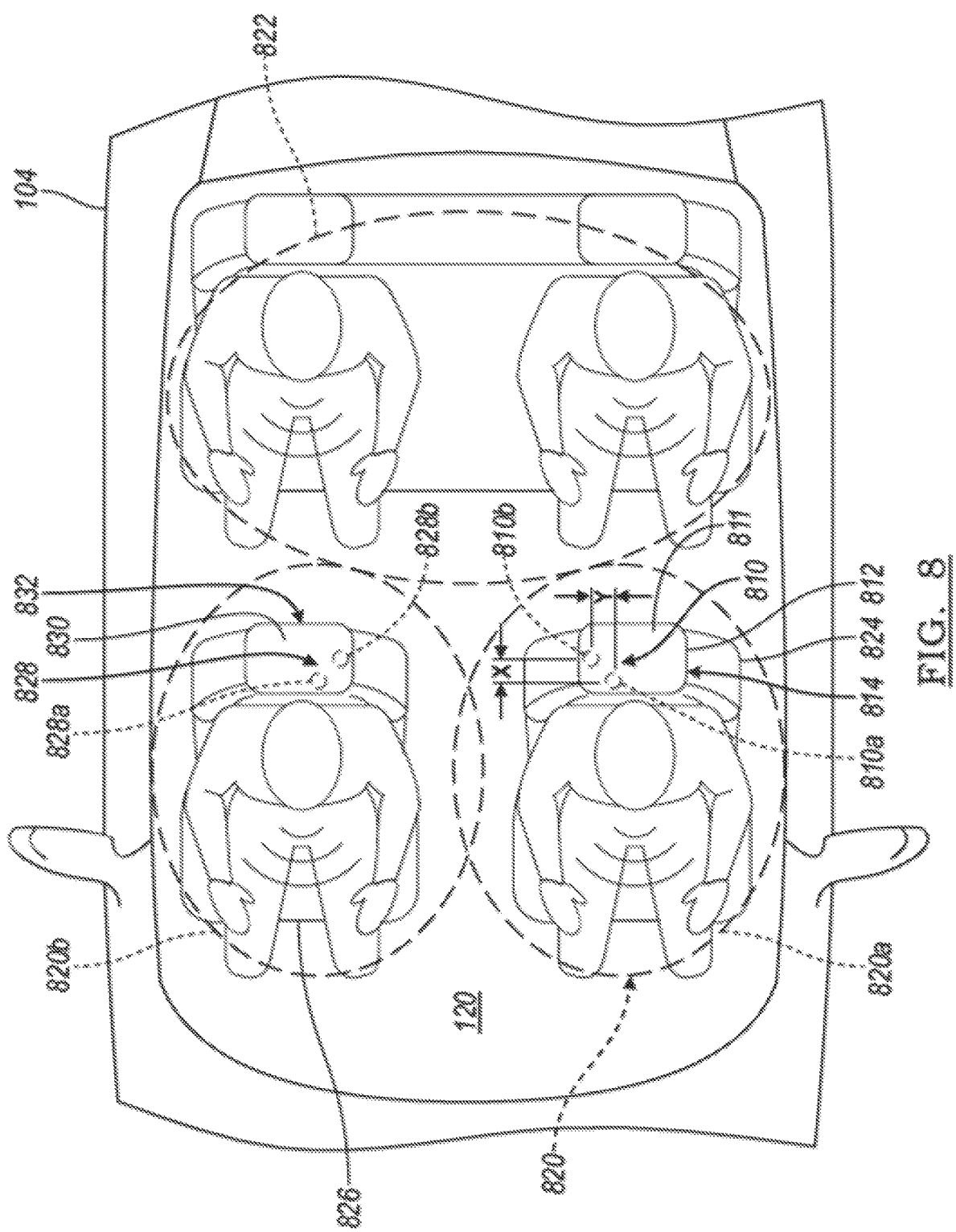
FIG. 8 is another plan view of a vehicle including at least one headrest microphone array for use in an in-cabin noise cancellation system, according to one or more embodiments of the present disclosure.

FIG. 8 is a plan view of the vehicle 104 depicting another sample microphone configuration, in accordance with one or more embodiments of the present disclosure. As shown, the noise cancellation system 128 (not shown) may include at least a first microphone array 810 including at least two microphones—a first microphone 810a and a second microphone 810b—mounted to a bottom surface 811 of an external surface 812 of a first headrest 814. Similar to FIG. 7, the first and second microphones 810a,b may be spaced apart in a longitudinal direction with respect to the vehicle 104. Thus, a distance separating the first and second microphones 810a,b may include at least a longitudinal distance X to create at least a first listening zone 820 and a second listening zone 822 oriented in the longitudinal direction. As described with respect to FIG. 7, the digital signal processor 114 may be programmed to receive microphone signals indicative of sound from the microphone array 810, as shown in FIG. 2, and identify whether the sound is received from a direction of the first listening zone 820 or the second listening zone 822 based on the microphone signals. Moreover, the digital signal processor 114 may suppress or cancel the microphone signals indicative of sound from (the direction of) the second listening zone 822, which may be equated with unwanted or disturbing background noise. On the other hand, the digital signal processor 114 may transmit microphone signals indicative of sound from (the direction of) the first listening zone 820, which may be equated with wanted, near-end speech, to a far-end participant in a communications exchange.

As shown in FIG. 8, the first and second microphones 810a,b may also be spaced apart in a lateral direction with respect to the vehicle 104. Thus, the distance separating the first and second microphones 810a,b may further include a lateral distance Y such that the first listening zone 820 comprises two listening subzones oriented in a lateral direction with respect to the vehicle 104. For instance, a first listening subzone 820a may encompass a region surrounding a driver's seat 824, while a second listening subzone 820b may encompass a region surrounding a front passenger seat 826. The lateral distance Y between the two microphones 810a,b in the first microphone array 810 may give an indication of the direction of incoming sound, generally left or right, such that the digital signal processor 114 may further identify whether the sound is received from a direction of the first listening subzone 820a or the second listening subzone 820b based on the microphone signals. Moreover, the digital signal processor 114 may be programmed to suppress or cancel microphone signals indicative of sound from (the direction of) the second listening subzone 820b, which may also be equated with unwanted or disturbing background noise. On the other hand, the digital signal processor 114 may transmit microphone signals indicative of sound from (the direction of) the first listening subzone 820a, which may be equated with wanted, near-end speech, to a far-end participant in a communications exchange.

As is further shown in FIG. 8, the noise cancellation system may include a second microphone array 828 including at least two microphones—a first microphone 828a and a second microphone 828b—mounted to a bottom surface 830 of a second headrest 832, which is laterally adjacent to the first headrest 814. The second microphone array's configuration may mirror that of the first microphone array. Accordingly, the first and second microphones 828a,b in the second microphone array 828 may be also be spaced apart in both the longitudinal direction and the lateral direction to give further indication of the direction of incoming sound, generally left or right, such that the digital signal processor 114 may further identify whether the sound is received from a direction of the first listening subzone 820a or the second listening subzone 820b based on the microphone signals. The microphones in the first and/or second microphone arrays may be either omnidirectional or directional microphones.

Figure 9:
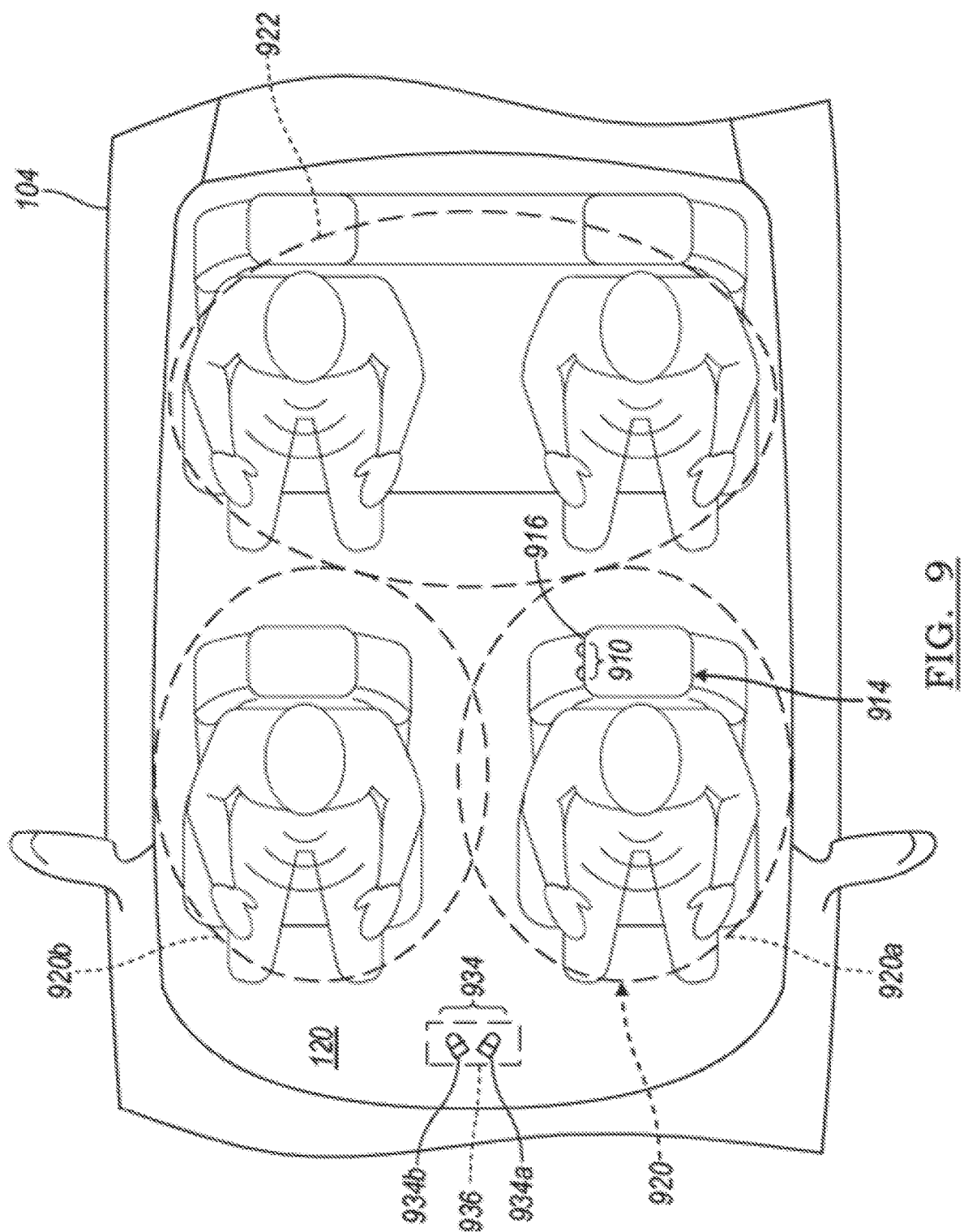
FIG. 9 is yet another plan view of a vehicle including at least one headrest microphone array and a rearview mirror assembly microphone array for use in an in-cabin noise cancellation system, according to one or more embodiments of the present disclosure.

FIG. 9 depicts yet another sample microphone configuration similar to the three-zone configuration shown in FIG. 8. As shown, a first microphone array 910 may be mounted to an inboard side surface 916 of a headrest 914, such as the microphone array shown in FIG. 7. Similar to FIG. 7, the first microphone array 910 may include a first microphone 910a and a second microphone 910b positioned on the inboard side surface 916 at spaced-apart locations, separated by a distance in the longitudinal direction to give an indication of the direction of incoming sound, forward or rearward. Thus, as previously described, the longitudinal separation of the first and second microphones 910a,b may create a first listening zone 920 and a second listening zone 922 oriented in the longitudinal direction. A second microphone array 934, including first and second microphones 934a,b, may be disposed in a rearview mirror assembly 936 rather than in the second headrest (as in FIG. 8) to give an indication of the direction of incoming sound, left or right, such that the digital signal processor 114 may further identify whether the sound is received from a direction of a first listening subzone 920*a* or a second listening subzone 920*b* based on the microphone signals. The first and second microphones 910*a,b* in the first microphone array 910 may be omnidirectional microphones. Moreover, the first and second microphones 934*a,b* in the second microphone array 934 may be directional microphones.

Figure 10:
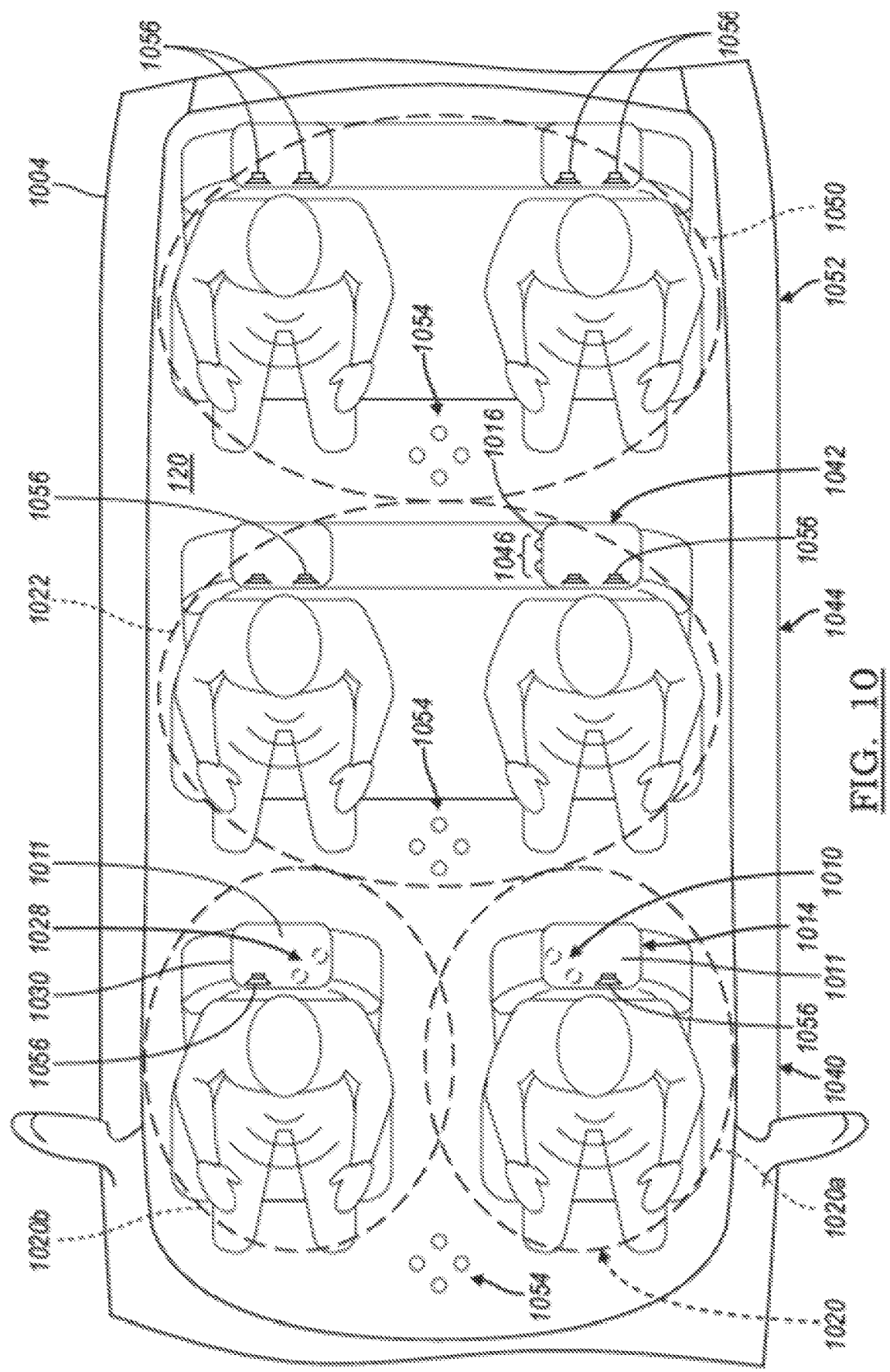
FIG. 10 is still yet another plan view of a vehicle including a plurality of various headrest microphone arrays for use in an in-cabin noise cancellation system, according to one or more embodiments of the present disclosure.

FIG. 10 is a plan view of a vehicle 1004 depicting yet another sample microphone configuration, in accordance with one or more embodiments of the present disclosure. As shown, the vehicle 1004 may include three rows of seating. The microphone configuration illustrated in FIG. 10 may employ a combination of various configurations described above with respect to FIGS. 7-9. For instance, a first row of seating 1040 may include a first microphone array 1010 in a first headrest 1014 and a second microphone array 1028 in a second headrest 1030, such as is illustrated in FIG. 8. Accordingly, microphones in each of the first and second microphone arrays 1010, 1028 may be mounted to a bottom surface 1011 of each corresponding headrest and spaced apart in both the longitudinal and lateral directions. The lateral spacing may create a first listening zone 1020 comprising a first listening subzone 1020*a* and a second listening subzone 1020*b* having lateral orientation, as previously described. Moreover, the longitudinal spacing may create a second listening zone 1022 rearward of the first listening zone 1020.

At least one headrest 1042 in a second row of seating 1044 may include a third microphone array 1046 similar to the microphone array 710 depicted in FIG. 7. Accordingly, microphones in the third microphone array 1046 may be mounted to an inboard side surface 1016 of the headrest 1042 and be spaced apart in at least the longitudinal direction to create a third listening zone 1050, rearward of the second listening zone 1022, that encompasses a third row of seating 1052. The vehicle 1004 may include additional microphone arrays 1054 positioned in the vehicle's ceiling or headliner (not shown), generally along a centerline of the vehicle. These additional microphone arrays 1054 may include three or four (as shown) microphones, which may be omnidirectional. All the various microphone arrays shown in FIG. 10 may form part of the noise cancellation system 128 and may cooperate with the digital signal processor 114 in a similar fashion as described in connection with FIGS. 7-9. Additionally, one or more of the headrests shown in FIG. 10 may further include at least one speaker 1056. The headrest-mounted speakers 1056 may be employed to transmit sound from a far-end participant of a communications exchange.

Figure 11:
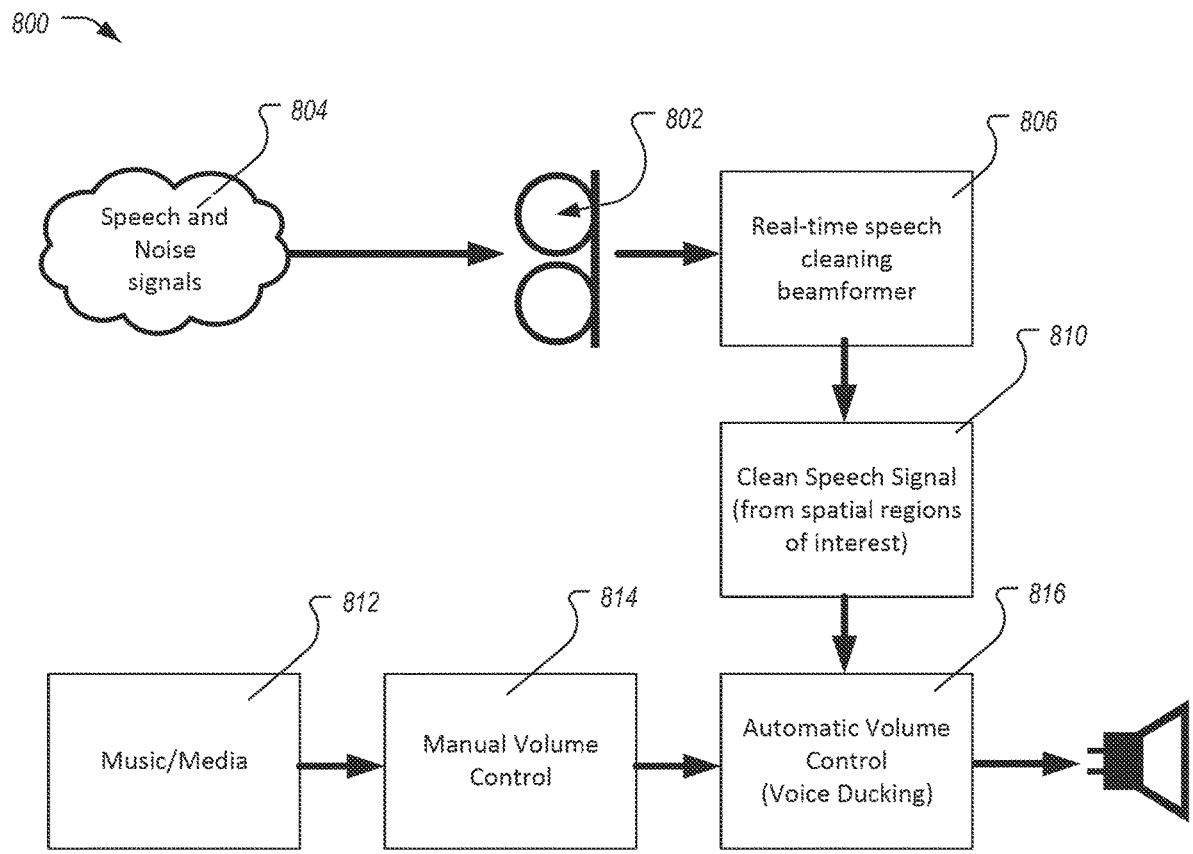
FIG. 11 illustrates a block diagram of a voice ducking system.

FIG. 11 illustrates an example ducking system 800. The ducking system 800 may include a microphone array 802 configured to pick up and receive incoming audio signals 804. The array 802 may be similar to the array's described previously and may be include a plurality of small, embedded microphones strategically located in the vehicle cabin to receive speech from a near-end participant (i.e., driver or another occupant of the source vehicle) of the telecommunications exchange. Arrangements and locations of the array 802 may be arranged, for example, as described herein with respect to FIGS. 5-10. The array 802 is shown in FIG. 11 as including 4 microphones, but may include more or less. The incoming audio signals 804 may include human speech as well as other noise signals, including music, background noise, road noise, et. While the array 802 is illustrated as including two microphones, the array 802 may include more than 2 microphones, including a four microphone array. The microphones could be directional microphones.

The system 800 may include a real-time speech cleaning algorithm or beamformer 806 similar to the beamformers described above, such as first beamformer 210, and second beamformer 212. While the beamformer 806 is described as such, this block may also include other processing such as noise suppression, echo cancellation, etc. Beamforming or spatial filtering is a signal processing technique used in sensor arrays for directional signal transmission or reception. This is achieved by combining elements in an array in such a way that signals at particular angles experience constructive interference while others experience destructive interference. Beamforming may be used at both the transmitting and receiving ends to achieve spatial selectivity. The improvement compared with omnidirectional reception/transmission is known as the directivity of the array. To change the directionality of the array when transmitting, a beamformer controls the phase and relative amplitude of the signal at each transmitter, to create a pattern of constructive and destructive interference in the wave front. When receiving, information from different sensors is combined in a way where the expected pattern of radiation is preferentially observed.

The beamformer 806 may output a speech signal 810. The speech signal 810 may include the human voice signals cleaned from the incoming audio signal 804. That is, the noise may be removed, leaving only human speech. This may aid in recognizing whether the incoming audio signals include human speech or not. The speech signal 810 may also include any type of human generated sound and is not limited to speech, such as humming, snapping, clapping, etc. Traditional methods of determining whether human speech is included often require large memories and high processing powers. Additionally, existing systems, due to the need for extensive processing to determine whether human speech is present, require latency before an incoming signal can be confirmed as a speech signal. This may lead to the beginning of the conversation not being routed to the ducking station. Further, non-speech, but human noises, such as "uh," "pfft," or "shh," may not be classified as speech signals and also not appropriately routed to the ducking station.

Since the beamformer relies on spatial region of interest, any and all sounds from that region are immediately routed into the ducking station. This includes non-speech utterances, and due to the beamforming being used to detect speech, the issue of latency is avoided because the region of interest is already defined and localized.

Non-human generated sounds emitting from the vehicle speakers, such as music and other media, may be played during use of the vehicle. However, during conversation, the occupants may wish to lower the non-speech sounds to allow for easier hearing and listening, Voice ducking may allow for this automatically without the need for human interaction with a volume control. In FIG. 11, these non-speech sounds 812 may be manually controlled at block 814, or automatically ducked at block 816. The ducked speech signals may be transmitted to the vehicle audio system.

Figure 12:
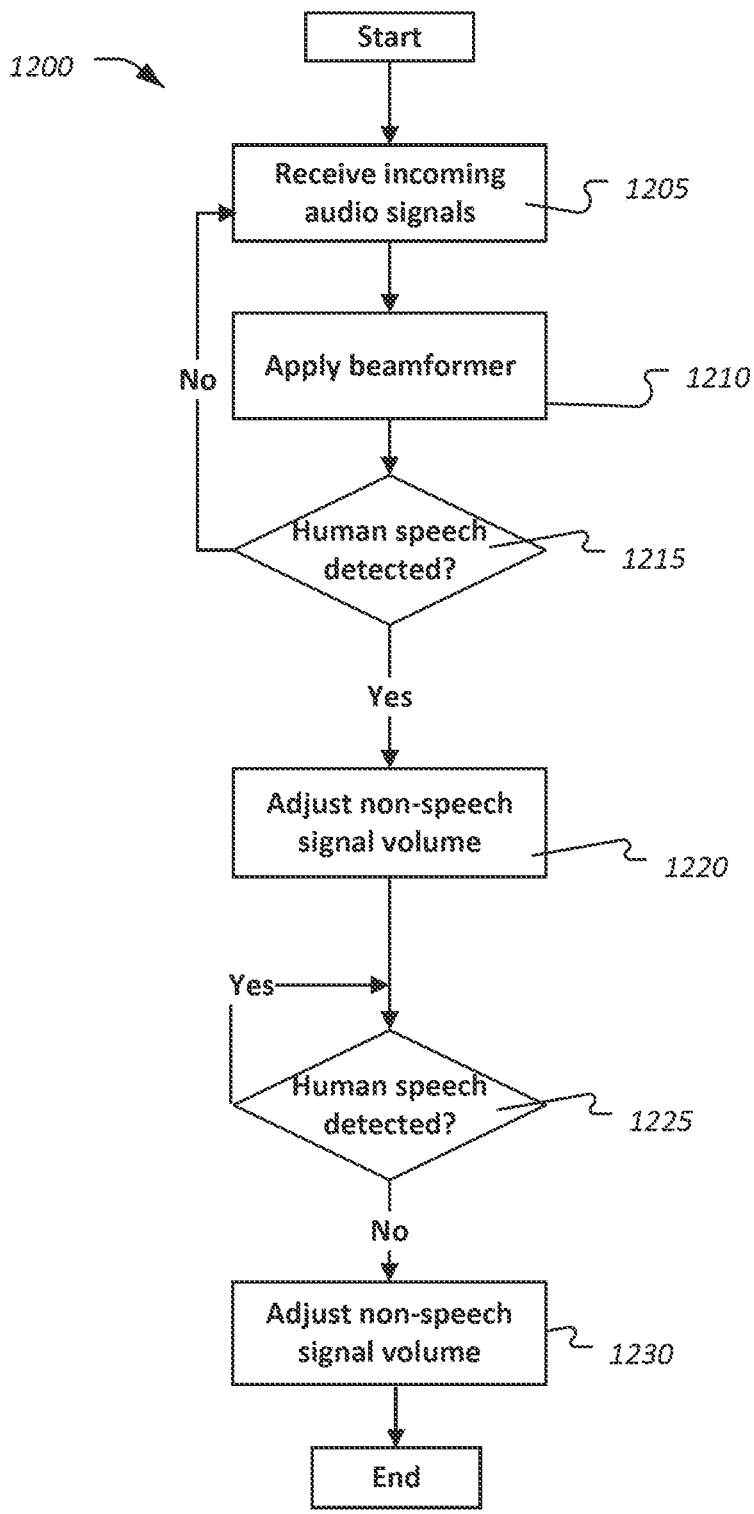
FIG. 12 illustrates an example process of the system of FIG. 11.

FIG. 12 illustrates an example process 1200 for the system 800 of FIG. 11. The process 1200 starts at block 1205 where the processor 114 may receive incoming audio signals from the array 802.

At block 1210, the processor 114 may apply the beamformer 806. The beamformer 806 may filter out, spatially, human speech sounds.

At block 1215, the processor 114 may determine from block 1210 if a spatial region of interest is detected, e.g., if an acoustical signal from the occupant is detected. That is, is any acoustic input from a region of interest above a threshold. If so, the threshold is used to adjust the non-speech media level. This can be visualized as a spotlight shining towards each occupant's head/mouth area. If so, the process 1200 proceeds to block 1220, if not, the process returns to block 1205.

At block 1220, the processor 114 may adjust the volume of the non-speech or non-human sounds being played by the vehicle audio system. The volume may be adjusted to decrease to a predefined level. That is, the volume may decrease, but still be audible to the occupants. The volume may be completely muted. The playback may be paused completely. Additionally or alternatively, the volume may be faded down to a mute, or faded down to a predetermined level. The volume level may be predefined by the user, user preferences, etc.

At block 1225, the processor 114 may monitor the beamformed audio signals to determine whether human speech is still present or not. If human speech is not present for a predefined amount of time, then the conversation may have ceased. In this case, the non-speech sounds may resume playing at their normal volume level. If speech ceases to be detected, the process 1200 proceeds to block 1230.

At block 1230, the processor 114 may instruct playback of the non-speech audio to be adjusted. This may include instructing playback of the non-speech audio to resume at the volume level previously established prior to the ducking. Similar to the adjusting during ducking, fading, muting, and the like may also be a form of adjustment of the playback volume.

The process 1200 may then end.

Accordingly, a system for detect human generated sounds and ducking the non-human sounds emitted from the vehicle speakers is disclosed. Because local microphones are used and/or beamforming techniques, any acoustic sound above a threshold may be considered human generated. Thus, cumbersome signal processing to determine whether the sound is human generated can be avoided. Further, directional microphones are not necessary. The beamforming processes described herein can be used, along with noise suppression, echo cancelation, and other signal processing to increase the viability of the human generated sounds.

Any one or more of the controllers or devices described herein include computer executable instructions that may be compiled or interpreted from computer programs created using a variety of programming languages and/or technologies. In general, a processor (such as a microprocessor) receives instructions, for example from a memory, a computer-readable medium, or the like, and executes the instructions. A processing unit includes a non-transitory computer-readable storage medium capable of executing instructions of a software program. The computer readable storage medium may be, but is not limited to, an electronic storage device, a magnetic storage device, an optical storage device, an electromagnetic storage device, a semi-conductor storage device, or any suitable combination thereof.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle loudspeaker system, comprising:
at least two microphones forming a microphone array;
at least one loudspeaker configured to emit sounds that include non-human sound;
a processor programmed to:
receive incoming audio signals from the microphone array;
apply beamforming to the incoming audio signals;
determine whether human generated sound is detected within the incoming audio signals based at least in part on an acoustic input of at least one of the incoming audio signals being above a threshold, wherein the acoustic input is associated with a specific region within the vehicle; and
decrease a volume of the non-human sound to be produced by the loudspeaker system in response to human generated sound being detected.

2. The system of claim 1, wherein the microphone array is arranged adjacent an occupant's head within the vehicle.

3. The system of claim 1, wherein the processor is programmed to apply at least one of noise suppression or echo cancelation to at least one incoming audio signal with the beamforming.

4. The system of claim 1, wherein the processor is programmed to detect human generated sound at the microphone array in response to the microphone array detecting acoustic signals.

5. The system of claim 1, wherein the microphone array includes four microphones.

6. A non-transitory computer-readable medium including instructions tar a loudspeaker system that generates audio in a vehicle, comprising:
receiving incoming audio signals from a vehicle microphone array;
applying beamforming to the incoming audio signals;
determining whether human generated sound is detected within the incoming audio signals based at least in part on an acoustic input within the audio signal being above a threshold, wherein the acoustic input is associated with a specific region within the vehicle via the beamforming; and
decreasing a volume of the non-human sound to be produced by the loudspeaker system in response to human generated sound being detected.

7. The medium of claim 6, wherein the acoustic input is associated with the specific region via the beamforming.

8. The medium of claim 6, wherein the microphone array is arranged adjacent an occupant's head within the vehicle.

9. The medium of claim 6, further comprising applying at least one of noise suppression or echo cancelation to at least one audio signal with the beamforming.

10. The medium of claim 6, further comprising detecting human generated sound at the microphone array in response to the microphone array detecting acoustic signals.

11. A method for generating audio via a loudspeaker system in a vehicle, the comprising:
receiving incoming audio signals from a vehicle microphone array;
applying beamforming to the incoming audio signals;
determining whether human generated sound is detected within the incoming audio signals based at least in part on an acoustic input within the audio signal being above a threshold, wherein the acoustic input is associated with a specific region within the vehicle via the beamforming; and decreasing a volume of the non-human sound to be produced by the loudspeaker system in response to human generated sound being detected.

\* \* \* \* \*